May 5, 1959 W. C. PIERCE 2,885,048
MAGNETIC FRICTION TORQUE PRODUCING DEVICE
Filed Sept. 16, 1957 2 Sheets-Sheet 2
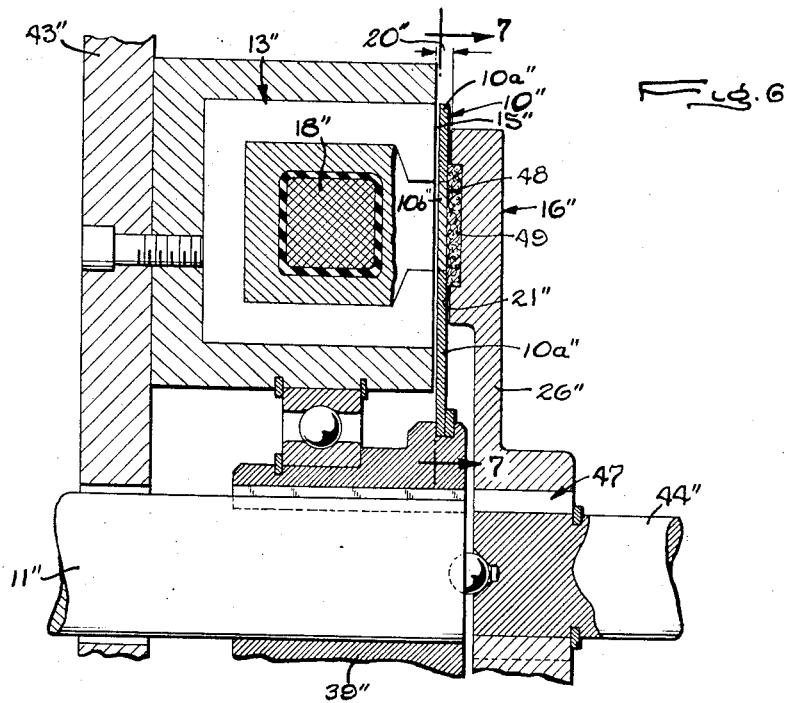
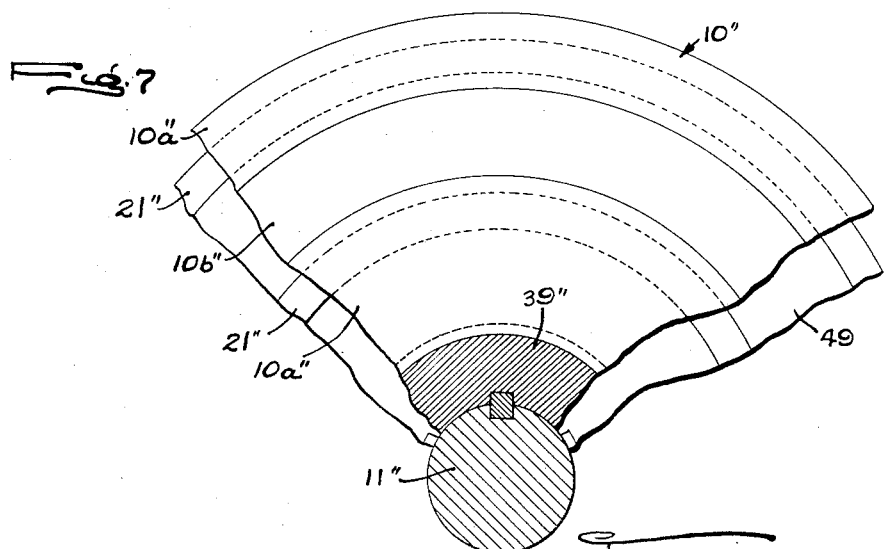
INVENTOR
William C. Pierce
by Carlson, Pitzner, Hubbard & Wolfe
ATTORNEYS

United States Patent Office 2,885,048
Patented May 5, 1959

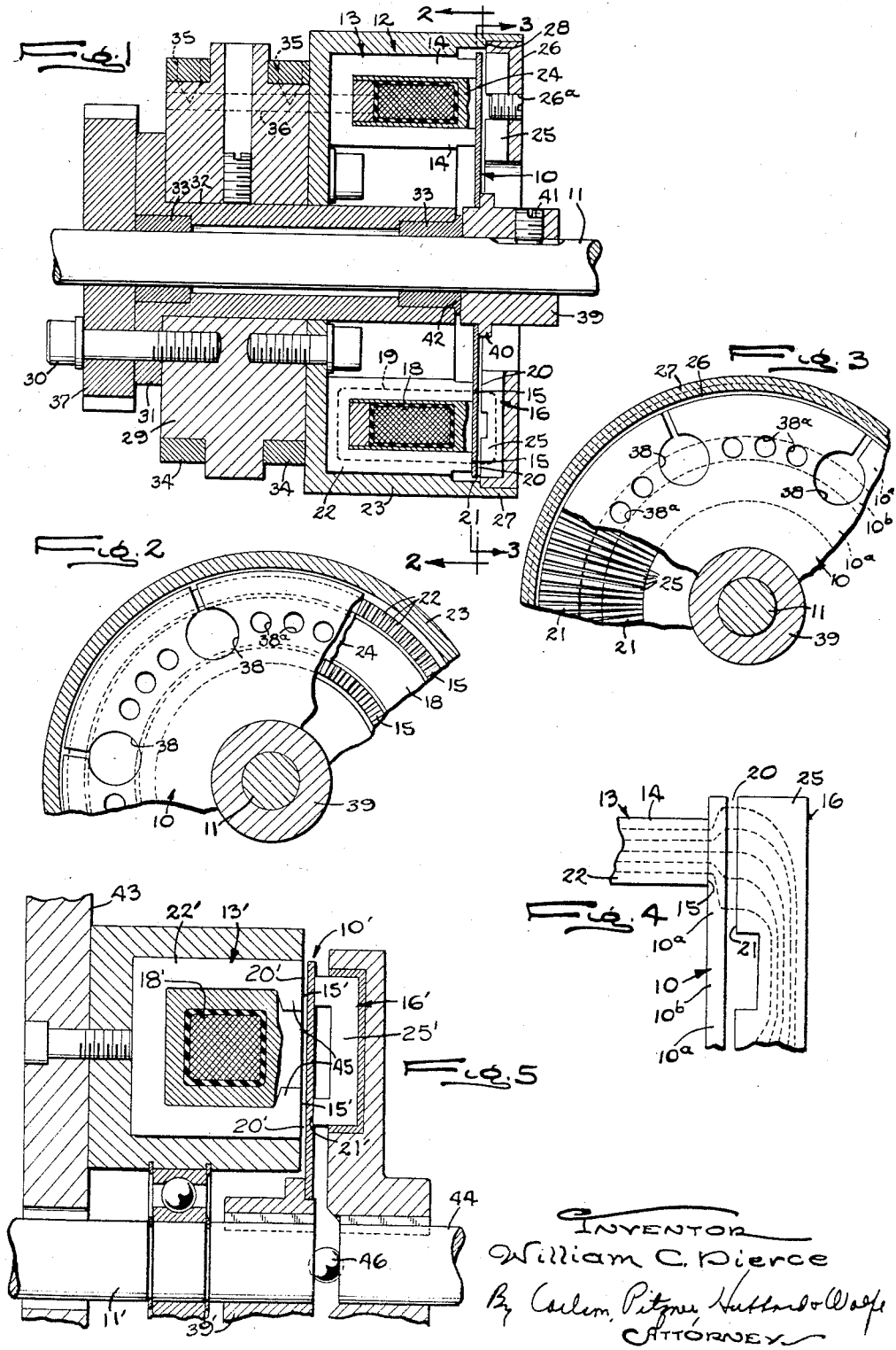

2,885,048
MAGNETIC FRICTION TORQUE PRODUCING DEVICE

William C. Pierce, Beloit, Wis., assignor to Warner Electric Brake & Clutch Company, South Beloit, Ill., a corporation of Illinois Application September 16, 1957, Serial No. 684,234

10 Claims. (Cl. 192—84)

This invention relates generally to a torque producing friction device of the type in which an annular armature of magnetic material is drawn into axial gripping engagement with an axially facing working face of the core of a relatively rotatable magnet by magnetic flux threading axially back and forth between the face and the armature. More particularly, the invention relates to a magnetic friction device in which the armature is a relatively thin disk-like ring of low inertia disposed between axially opposed faces of the magnet core and an auxiliary core located on the side of the armature opposite the magnet core to carry the major portion of the active flux in the armature.

The primary object of the invention is to provide a novel friction device of the above character in which application and release are effected quickly and without the loss of time incident to relative axial shifting of the two cores.

Another object is to achieve fast application by constructing the cores in a novel manner for selective attraction of the armature toward only one of the opposed core faces while the latter remain at a fixed axial spacing so as to define a narrow axial gap wider than the axial thickness of the armature.

A more detailed object is to effect selective attraction of the armature toward only one core face by making the faces of different areas so that the flux density and therefore the attractive force at one face are greater than at the other face.

The invention also resides in the novel manner of utilizing the different core face areas to provide a clutch in which the magnet core is mounted staationarily thereby eliminating the necessity of collector rings for transmitting current to the magnet winding.

Other objects and advantages of the invention will become apparent from the following detailed description taken in connection with the accompanying drawings, in which Figure 1 is a diametrical cross sectional view of a clutch embodying the novel features of the present invention.

Figs. 2 and 3 are fragmentary sectional views taken along the lines 2—2 and 3—3 respectively of Fig. 1.

Fig. 4 is a schematic view showing the flux distribution in a part of the magnet core.

Fig. 5 is a fragmentary view similar to Fig. 1 of a modified construction.

Fig. 6 is a view similar to Fig. 5 of a further modification.

Fig. 7 is a fragmentary sectional view taken along the line 7—7 of Fig. 6.

In Figs. 1 to 4 of the drawings, the invention is shown for purposes of illustration embodied in an electromagnetic friction clutch comprising a driven magnetic armature disk 10 fast on an output shaft 11 and a magnet 12 rotatable relative to the armature and having an annular core 13. The latter is coaxial with the armature and is formed of magnetic material of U-shaped radial section with radially spaced pole pieces 14 terminating in flat end faces 15 which are spanned by and face axially toward the armature. An annular multiple turn winding 18 encircling the core 13 between the pole pieces 14 constitutes a flux means operable when activated by current flow therethrough to produce magnetic flux which threads a toroidal path extending axially between the armature and the pole faces as indicated by a dotted line 19 (Fig. 1) to draw the armature into frictional gripping engagement with the pole faces.

The magnet core 13 preferably is laminated to reduce eddy current and hysteresis losses which cause a time delay between an increase of current in the winding 18 and the resulting build-up of magnetic flux in the core and therefore tend to lengthen the response time of the clutch. This is the time elapsing between energization of the winding and acceleration of the armature 10 to the rated speed. In this instance, the core comprises a plurality of flat radially disposed plates 22 of U-shape arranged in an annular series about the winding 18 within a cup-shaped supporting member 23 of insulating material. A suitable hardened cement 24 filling the spaces within the cup between the plates and around the winding secures the cup, the plates and the winding rigidly together.

To support the magnet core 13 for rotation about the axis of the armature 10, an insulating ring 29 bolted to the core cup 23 also is secured by bolts 30 to a radial flange 31 of a sleeve 32 which carries bushings 33 journaled on the output shaft 11. Collector rings 34 carried by the insulating ring 29 are coupled by conducting screws 35 to input leads 36 of the winding 18 for current flow to the latter from stationary brushes (not shown) riding on the collector rings. Power for rotating the unitary assembly of the magnet 12 and the insulating ring 29 may be transmitted thereto in any suitable manner, for example, through a gear 27 secured to the flange 31 by the bolts 30.

Further reduction in the response time of the clutch is obtained by making the armature 10 relatively thin axially and perforating the same as indicated at 38 and 38a (Figs. 2 and 3) so as to reduce the mass and thus the inertia of the armature. The perforations are located in a connection 10b between concentric annular rings 10a of magnetic material coaxial with and radially overlapping the magnet core faces 15. In the forms shown in Figs. 1 to 5, the connection 10b is magnetic the same as the concentric rings and is formed integral with the latter as a part of the same disk. Herein, the disk is stamped from a sheet of hard magnetic steel on the order of .026 of an inch thick. At its inner periphery, the disk telescopes over a sleeve 39 and is secured as by staking against a radial flange 40 on the sleeve. The latter is adjustably fastened to the output shaft 11 by a set screw 41.

In order to attract the concentric rings 10a of the armature 10 with the desired force, more flux is required in the pole faces 15 than the magnetic connection 10b, due to its thin axial section and the perforations 38 and 38a, can carry before becoming saturated. To carry the additional flux which the magnetic connection cannot carry, an auxiliary core 16 of greater axial thickness than the armature bridges the concentric rings 10a on the opposite side of the armature from the main core 13. Annular working faces 21 on the auxiliary core face axially toward and overlap the concentric rings radially and are spaced from the main core faces 15 so as to cooperate therewith to define radially spaced air gaps 20 receiving the armature.

In the present instance, the auxiliary core 16 is constructed similarly to the main core 13 and comprises a plurality of radially disposed flat U-shaped plates 25 arranged in an annular series within an insulating cup 26 and secured to the latter and each other by a suitable cement. To carry all of the flux which the armature is unable to carry in the connection 10b between the concentric rings 10a, the auxiliary core is made thick enough axially that the reluctance of its smallest section between the working faces 21 is substantially greater than that of the connection. The major portion of the magnet flux thus is forced to thread the toroidal path 19 which extends radially through the back of the U of the main core 13 and through the auxiliary core between the working faces 21, but only axially through the armature rings 10a and across both gaps 20 between the opposed faces 15 and 21.

In accordance with the invention, the response time of the clutch is kept small by mounting the cores 13 and 16 in a novel manner to avoid relative axial shifting of these parts and the loss of time incident to such shifting during application and release of the clutch. This is accomplished by limiting axial movement of the cores toward each other to positions in which their axial spacing at the air gaps 20 is greater than the axial thickness of the armature rings 10a. Application of the clutch with such spacing is made possible by a novel construction of the opposed faces 15 and 21 of the cores to cause attraction of the armature to only one core. For this purpose, the area of at least one face on one core is made substantially larger than the opposed face on the other core.

As a result of the differential areas of the opposed pole faces 15 and 21, there is a fanning out of the flux threading the armature in the gap 20 between such faces as shown in Fig. 4 to provide a greater flux density in the smaller face than in the larger face and a correspondingly greater force attracting the armature toward the smaller face. To take advantage of the flux threading each gap 20, it is preferred to form the opposed faces at both gaps with such differential areas. In the clutch shown Figs. 1 to 4, the main core faces 15 are of smaller area being equal approximately to one half of the area of the auxiliary faces 21.

Limitation of the axial movement of the cores 13 and 16 toward each other to prevent them from shifting during energization and deenergization of the winding 18 is effected in the clutch of Figs. 1 to 4 by mounting the cores axially fixed relation. For this purpose, the cores are secured rigidly together as by a press fit between the outer periphery of the auxiliary supporting cup 26 and the lip 27 of the main cup 23. An axially facing shoulder 28 on the main cup limits inward movement of the auxiliary cup to a position in which the opposed faces 15 and 21 are spaced apart to define the air gaps 20 receiving the armature 10. To facilitate removal of the auxiliary cup from the main cup and provide adjustment of the air gaps, holes 26a are drilled and tapped to receive screws at angularly spaced points around the auxiliary cup. When the parts are not rotating, the screws are turned so as to project inwardly through the larger perforations 38 of the armature 10 and into abutment with the cement 24 to push the auxiliary core outwardly. After the adjustment is made, the screws are retracted axially beyond the armature to permit the latter to rotate relative to the auxiliary core. In this instance, the axial length of each gap 20 is approximately .036 of an inch.

The armature 10 preferably is supported in light running contact with the main core pole faces 15 to avoid relative axial shifting of the two during application and release of the clutch. Herein, such contact is obtained by adjusting the armature supporting sleeve 39 axially of the main core, the desired position being determined by a narrow washer ring 42 between the sleeve 39 and the adjacent bushing 33 of the main core sleeve 32. In the assembly of the clutch parts, the supporting cup 26 of the auxiliary core 16 is pressed into the lip 27 of the main core cup 23 after the armature 10 has been shifted axially into the main cup and adjacent the pole faces 15.

In the operation of the clutch with the winding 18 deenergized, the armature 10 is in light running contact with the main core faces 15 and is separated from the auxiliary core by the difference between the armature thickness and the axial lengths of the air gaps 20. Upon energization of the winding, the major portion of the flux produced thereby is forced through the path 19 extending across the air gaps 20 and axially through the concentric portions 10a of the armature overlapping the working faces of the cores. The remaining flux threads radially through the magnetic connection 10b between the armature rings 10a. In one clutch constructed as described above the flux threading the armature radially between the pole faces 15 of the main core amounted to approximately 30 percent of the total flux at each pole face.

Since some of the flux by-passes the auxiliary core 16 and due to the differential areas of the opposed faces 15 and 21 at each gap 20, the flux density in the smaller main core faces 15 is substantially larger than that of the auxiliary faces 21. The magnetic pull of the main core 13 for the armature is correspondingly greater than the pull of the auxiliary core. The armature thus is drawn into frictional gripping engagement with the main core faces for the transfer of torque from the driving member 37 to the output shaft 11. By virtue of the small mass of the armature and the fixed axial relation of the cores, the clutch is engaged rapidly in response to the building up of flux in the core parts. Release of the clutch is similarly rapid when the winding 18 is deenergized and the flux in the cores decays.

The modified clutch of Fig. 5 is similar to that of Figs. 1 to 4 in the mounting of the cores 13' and 16' in axially fixed relation to avoid axial shifting of the cores during application and release of the clutch. The magnet 12' however, instead of rotating with the auxiliary core, is stationarily mounted thereby eliminating the necessity of collector rings. To this end, the magnet is bolted to a stationary support 43, the auxiliary core 16' being fast on an input shaft 44 coaxial with the output shaft 11'. The latter is journaled in bearings on the fixed core and carries the sleeve 39' which supports the armature 10'. A thrust bearing 46 engaging adjacent ends of the shafts 44 and 11' maintains the same in axially fixed positions in which the auxiliary core faces 21' are spaced from the main core faces 15' to define air gaps 20' of fixed axial length greater than the thickness of the armature 10'.

Attraction of the armature 10' toward the auxiliary core 16' with the magnet 12' mounted stationarily and the cores 13' and 16' fixed axially relative to each other is achieved by making the auxiliary core faces 21' of smaller area than the main core faces 15'. Herein, the main core faces 15' are enlarged by radial extensions 45 on the lamination 22' and the auxiliary faces on the laminations 25' are made shorter radially. The armature 10' is the same construction as the armature 10 of Figs. 1 to 4 and is maintained in light running contact with the auxiliary faces by adjusting the position of the sleeve 39' along the output shaft 11'. Upon energization of the magnet winding 18', the resulting flux in the air gaps 20' will be of greater density at the auxiliary faces 21' due to their smaller area so that the armature always is attracted toward and into contact with these faces.

As in the clutch shown in Fig. 5, the armature 10" of the modified clutch of Figs. 6 and 7 comprises a thin flat disk supported on an adjustable sleeve 39" on the output shaft 11" and having two radially spaced rings 10a" of magnetic material disposed between and radially overlapping the core faces 15" and 21". The connection 10b" between the magnetic rings differs however in its formation of non-magnetic material so that substantially all of the flux resulting from energization of the winding 18" threads the auxiliary core 16" and its working faces 21". In this instance, the connection is a flat copper ring whose inner and outer peripheral edges are brazed to the adjacent peripheral edges of the magnetic rings 10a".

The main core 13" of the modification of Figs. 6 and 7 is of the same construction and is mounted in the same way as the main core 13' of Fig. 5 on a stationary support 43". The auxiliary core 16" is shown as a solid ring of magnetic material of U-shaped radial cross section with its working faces 21" of smaller area than the main core faces 15" for attraction of the armature 10" toward the auxiliary core upon energization of the winding 18". Instead of being secured in a fixed axial position on the input shaft 44" however, the auxiliary core 16" is shiftable axially along the shaft, the mounting for the core comprising a ring 26" integral with the core and splined at 47 on the shaft.

Movement of the auxiliary core 16" axially along the input shaft 44" and toward the main core 13" is limited to a position in which the air gaps 20" are wider axially than the axial thickness of the armature rings the same as in the clutches of Figs. 1 to 5 so as to avoid relative axial shifting of the cores during application of the clutch. For this purpose, a stop 48 fixed axially with respect to the main core is positioned to engage the auxiliary core or a part rigid therewith. While the stop may be mounted on the input shaft, it is defined in this instance by the side of the armature 10" facing axially toward the auxiliary core. The other side of the armature is maintained at a fixed spacing from the main core by adjusting the position of the sleeve 39" along the output shaft 11".

Another difference in the modified clutch of Fig. 6 is the provision of a ring 49 of suitable friction material secured between and projecting axially beyond the auxiliary faces 21". With this construction, the armature 10", while being attracted toward the auxiliary faces upon energization of the winding 18", engages the friction ring rather than the auxiliary faces. As an incident to such engagement, the armature limits the axial movement of the auxiliary core 16" toward the main core to a position in which the air gaps 20" are wider axially than the thickness of the armature. Upon deenergization of the winding, the auxiliary core remains in substantially the same axial position for light running contact of the friction ring with the opposing face 48 of the armature. As an alternative, this face may be covered with a thin layer of friction material and the ring 49 may be omitted.

I claim as my invention:

1. In a magnetic friction device, the combination of, a first ring member of magnetic material providing concentric pole pieces terminating in annular radially spaced and axially facing first faces, a second ring member of magnetic material bridging said first faces and having flat annular faces opposing and axially spaced from the respective first faces to define radially spaced gaps, each of said second faces being of substantially greater radial width and of larger area than the opposed first face, a relatively thin and flat armature ring disposed between said members and having concentric rings of magnetic material radially overlapping said first and second faces at said gaps, means on said first ring member operable when activated to produce magnetic flux threading a path extending around the first member, axially back and forth through said gaps and said rings, and radially through said second member, the reluctance of said armature between said rings being greater than that of the minimum section of said second member by an amount sufficient to force through the second member at least the major portion of the flux produced by activation of said flux means, means rigidly joining said members to form a magnetic core unit, and means supporting said unit and said armature ring for relative rotation about the axis of the members with said armature disposed substantially in axial contact with said first faces, the flux through said armature ring and between said faces at each of said gaps fanning out to produce a greater flux density in the first face than in the second face so as to insure drawing of said armature axially into gripping engagement with the first faces.

2. A magnetic torque producing friction device having, in combination, an annular core of magnetic material and channel cross section stationarily supported about an axis and providing radially spaced axially facing pole faces, an annular bridging member of magnetic material coaxial with and rotatable relative to said core and having working faces axially alined with and opposing said pole faces, means supporting said bridging member and said core in axially fixed relation with said faces spaced apart axially to define radially spaced air gaps, said member and said core cooperating to form a toroidal flux path extending around the core and the member and axially back and forth across said air gaps, an armature having two concentric rings of magnetic material disposed between and radially overlapping said faces at said gaps, means on said core operable when activated to produce magnetic flux threading said path, the reluctance of said armature between said rings being greater than that of the minimum section of said path through said bridging member by an amount sufficient to force through the member at least the major portion of the flux produced by activation of said flux means, means supporting said armature for rotation about said axis, the areas of said faces on said core being substantially larger than the areas of the faces of said bridging member whereby to cause fanning out of the flux threading said gaps between said faces to produce a greater flux density at said smaller faces to draw said armature into axial gripping engagement with the smaller faces.

3. In a magnetic friction device, the combination of, an annular magnetic core member of U-shaped radial cross section providing axially facing radially separated pole faces, an annular bridging member of magnetic material spanning said pole faces and having axially facing working faces axially alined with the pole faces and overlapping the same radially, means supporting said members in axially fixed relation with said faces spaced apart axially to define radially spaced annular air gaps, an armature having relatively thin concentric rings of magnetic material disposed in said gaps and cooperating with said members to define a toroidal flux path extending around the core member, radially through the bridging member, and axially back and forth through said rings and across said gaps, means on said core member operable when activated to produce magnetic flux threading said path, the reluctance of said armature between said concentric rings being substantially greater than that of the smallest section of said path through said bridging member whereby to force through the bridging member at least the major portion of flux produced by activation of said flux means, and means supporting said armature for rotation relative to said members about the axis of the latter, each of said faces on one of said members being substantially wider radially than the opposed face of the other member and radially overlapping the intervening armature ring whereby to cause fanning out of the flux threading the gap between such faces and thereby produce a greater flux density in the narrower face so as to insure drawing of said armature into axial gripping engagement with said other member.

4. In a magnetic friction device, the combination of, an annular magnetic core member of U-shaped radial cross section providing axially facing radially separated pole faces, an annular magnetic bridging member spanning said pole faces and having axially facing working faces axially alined with and opposing the pole faces, means supporting said members in axially fixed relation with said faces spaced apart axially to define radially spaced annular air gaps, an armature having relatively thin concentric rings of magnetic material disposed in said gaps and cooperating with said members to define a toroidal flux path extending around the core member, axially across one of said gaps and through one of said rings, radially through the bridging member, and axially back to the core member across the other gap and through the other of said rings, means on said core member operable when activated to produce magnetic flux threading said path, the reluctance of said armature between said concentric rings being substantially greater than that of the smallest section of said path through said bridging member whereby to force through the bridging member at least the major portion of flux produced by activation of said flux means, and means supporting said armature for rotation relative to said members about the axis of the latter, at least one of said faces on one of said members being substantially wider radially than the opposed face of the other member and radially overlapping the intervening armature ring whereby to cause fanning out of the flux threading the gap between such faces and thereby produce a greater flux density at the narrower face so as to insure drawing of said armature against the latter face.

5. In a magnetic friction device, the combination of, an annular magnetic core member providing an annular axially facing pole face spaced radially from the axis of the member an annular second magnetic member coaxial with said core member and having an annular working face opposing and radially overlapping said pole face, means supporting said members in axially fixed relation with said faces spaced apart axially to define an annular air gap of narrow axial length, an armature ring of magnetic material disposed between and radially overlapping said faces and having a narrower axial dimension than said gap, means on said core member operable when activated to produce magnetic flux threading a path extending axially from one of said faces to the other across said gap and through said ring, one of said faces having a larger area than the other face whereby the flux density in the smaller face is greater than that of the larger face to attract said armature ring against the smaller face when said flux means is activated, and means supporting said ring for rotation about the axis of said members and relative to said smaller face with the ring disposed substantially in axial contact with the smaller face.

6. In a magnetic friction device, the combination of, an annular magnetic core member providing an annular axially facing pole face spaced radially from the axis of the member, an annular second magnetic member coaxial with said core member and having an annular working face opposing and radially overlapping said pole face, means supporting said members in axially fixed relation with said faces spaced apart axially to define an annular air gap of narrow axial length, an armature ring of magnetic material supported for rotation about the axis of said members and disposed between and radially overlapping said faces, said armature ring having a narrower axial dimension than said gap, and means on said core member operable when activated to produce magnetic flux threading a path extending axially from one of said faces to the other across said gap and through said armature ring, one of said faces having a greater area than the other face whereby the flux density in the face of smaller area is greater than that of the other face to attract said armature ring toward the smaller face when said flux means is activated.

7. In a magnetic friction device, the combination of, a stationarily mounted magnet having an annular core of magnetic material of U-shaped radial cross section with radially spaced pole pieces terminating in substantially flush axially facing pole faces, an auxiliary core of magnetic material of U-shaped radial cross section coaxial with said magnet core and having radially spaced pole pieces terminating in working faces facing axially toward said pole faces and cooperating therewith to define radially spaced air gaps, means supporting said auxiliary core for rotation about the axis of said magnet core, and for movement axially of the latter, a stop fixed axially with respect to said magnet core and engaging a part rigid with said auxiliary core to limit movement of the auxiliary core axially toward the magnet core to a position in which said air gaps are of a predetermined narrow width axially, an armature having two concentric disk-like rings of magnetic material coaxial with and disposed in said gaps and thinner axially than said predetermined gap width, means supporting said armature for rotation about said axis, said armature rings and said cores defining a toroidal flux path extending axially back and forth across said gaps and through the rings, and means on said magnet core operable when activated to produce magnetic flux threading said path, said working faces on said auxiliary core having smaller areas than said magnet pole faces whereby the flux density in the working faces is sufficiently greater than that in the pole faces to always attract said armature rings toward the working faces when said flux means is activated.

8. In a magnetic friction device the combination of, a stationarily mounted magnet having an annular core of magnetic material of U-shaped radial cross section with radially spaced pole pieces terminating in substantially flush axially facing pole faces, an auxiliary core of magnetic material of U-shaped radial cross section coaxial with said magnet core and having radially spaced pole pieces terminating in working faces facing axially toward said pole faces and cooperating therewith to define radially spaced air gaps, means supporting said auxiliary core for rotation about the axis of said magnet core and including means for limiting movement of the auxiliary core axially toward the magnet core from a position in which said air gaps are of a predetermined narrow width axially, an armature having two concentric disk-like rings of magnetic material coaxial with and disposed in said gaps and thinner axially than said predetermined gap width, means supporting said armature for rotation about said axis, said armature rings and said cores defining a toroidal flux path extending axially back and forth across said gaps and through the rings, and means on said magnet core operable when activated to produce magnetic flux threading said path, said working faces on said auxiliary core having smaller areas than said magnet pole faces whereby the flux density in the working faces is sufficiently greater than that in the pole faces to always attract said armature rings toward the working faces when said flux means is activated.

9. In a magnetic friction device, the combination of, a stationarily mounted magnet having an annular core of magnetic material providing an axially facing annular pole face, an auxiliary core of magnetic material coaxial with said magnet core and having an annular working face facing axially toward said pole face and cooperating therewith to define an axial air gap, means supporting said auxiliary core for rotation about the axis of said magnet core and including means for limiting movement of the auxiliary core axially toward the magnet core from a position in which said air gap is of a predetermined narrow width axially, an armature comprising a disk-like ring of magnetic material coaxial with and disposed in said gap and thinner axially than said predetermined gap width, means supporting said armature for rotation about said axis, said armature ring and said cores defining a flux path extending axially back and forth across said gap and through the ring, and means on said magnet core operable when activated to produce magnetic flux threading said path, said working face on said auxiliary core having a smaller area than said magnet pole face whereby the flux density in the working face is sufficiently greater than that in the pole face to always attract said armature ring toward the working face when said flux means is activated.

10. In a magnetic friction torque producing device, first and second core members coaxial with each other and providing first and second axially opposed and axially spaced annular working faces, an armature member in the form of a thin disk-like ring of magnetic material coaxial with said core members and disposed between and radially overlapping said faces, means supporting said members for relative rotation of the armature member and at least the first core member about said axis and including means for limiting movement of said core members axially toward each other from positions in which said faces are spaced apart so as to define a narrow gap wider axially than the axial thickness of said armature ring and in which said armature ring is disposed adjacent said first face and is spaced axially from said second face, means on one of said core members operable when activated to produce magnetic flux threading a path extending axially from one of said faces to the other across said gap and through said ring, said first face having a greater area than said second face whereby the flux density in the first face is sufficiently greater than that in the second face to always attract said armature toward the first face when said flux means is activated.

References Cited in the file of this patent

UNITED STATES PATENTS 2,618,368  Hoover _____ Nov. 18, 1952

FOREIGN PATENTS 806,299  Germany _____ June 14, 1951